US012670881B1

(12) United States Patent
Wu

(10) Patent No.: US 12,670,881 B1
(45) Date of Patent: Jun. 30, 2026

(54) TIMING CONTROLLER AND DYNAMIC CHARGE SHARING METHOD THEREOF

(71) Applicant: HIMAX TECHNOLOGIES LIMITED, Tainan City (TW)

(72) Inventor: Tung Ying Wu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/269,060

(22) Filed: Jul. 15, 2025

(51) Int. Cl.
*G09G 5/00* (2006.01)

(52) U.S. Cl.
CPC ....... *G09G 5/003* (2013.01); *G09G 2310/027* (2013.01); *G09G 2310/0289* (2013.01); *G09G 2310/0291* (2013.01); *G09G 2330/023* (2013.01)

(58) Field of Classification Search
CPC ............. G09G 5/003; G09G 2310/027; G09G 2310/0289; G09G 2310/0291; G09G 2330/023
See application file for complete search history.

(56) References Cited

U.S. PATENT DOCUMENTS

2009/0002291 A1* 1/2009 Koo ..................... G09G 3/3614 345/87
2010/0315321 A1* 12/2010 Huang ................. G09G 3/3659 345/94
2014/0104260 A1* 4/2014 Chang .................. G09G 3/3607 345/212
2018/0096666 A1* 4/2018 Chung ................. G09G 3/3696

* cited by examiner

*Primary Examiner* — Abhishek Sarma
(74) *Attorney, Agent, or Firm* — CKC & Partners Co., LLC

(57) ABSTRACT

A dynamic charge sharing control method includes receiving first and second row pixel data on display panel; selecting different numbers of first and second sub-pixels in first row corresponding to different charge sharing modes; averaging pixel data of selected first sub-pixels to obtain first average value and averaging pixel data of selected second sub-pixels to obtain second average value for each charge sharing mode; referencing sub-pixels in second row to corresponding sub-pixels in first row; calculating transition power for the sub-pixels in first row under each charge sharing mode by transiting first or second average value of each sub-pixel in first row into target pixel data of a corresponding one sub-pixel in second row; summing the transition power of all sub-pixels in first row to obtain total channel power for each charge sharing mode; and selecting one charge sharing mode with the minimum total channel power.

17 Claims, 10 Drawing Sheets

TIMING CONTROLLER AND DYNAMIC CHARGE SHARING METHOD THEREOF

BACKGROUND

Technical Field

The disclosure relates to display driving, and more particularly, to a timing controller with dynamic charge sharing control function.

Description of Related Art

In conventional display systems, the driver sequentially activates each gate line during frame updates, resulting in frequent voltage transitions and high transition power consumption. Therefore, how to reduce the transition power loss of the driver during the transition process through the timing controller has become a critical issue to be addressed in the field.

SUMMARY

A dynamic charge sharing control method for a timing controller is provided. The dynamic charge sharing control method includes receiving pixel data in a first row and a second row on a display panel, in which the first row and the second row each include multiple sub-pixel groups, and each of the sub-pixel groups includes multiple first sub-pixels and multiple second sub-pixels; selecting different numbers of the first sub-pixels and the second sub-pixels in each sub-pixel group of the first row to define a plurality of charge sharing modes for a source driver; respectively averaging the pixel data of the selected first sub-pixels and the selected second sub-pixels in each sub-pixel group of the first row to obtain a first average value and a second average value for each charge sharing mode; referencing each of the first sub-pixels and the second sub-pixels in the second row to a corresponding one of the first sub-pixels and the second sub-pixels in the first row; calculating a transition power level for each of the first sub-pixels and the second sub-pixels in the first row under each charge sharing mode by transiting the first average value or the second average value of the corresponding one of the first sub-pixels and the second sub-pixels in the first row into a target pixel data of a corresponding one of the first sub-pixels and the second sub-pixels in the second row; summing the transition power of all first sub-pixels and second sub-pixels in each sub-pixel group in the first row to obtain a total channel power level for each sub-pixel group under each charge sharing mode; and selecting one of the charge sharing modes with a minimum total channel power level for each of the sub-pixel groups in the first row.

A timing controller applicable to a source driver is provided. The timing controller includes a power calculator and a mode selector. The power calculator is configured to receive pixel data in a first row and a second row on a display panel, in which the first row and the second row each include a plurality of sub-pixel groups, and each of the sub-pixel groups comprises a plurality of first sub-pixels and a plurality of second sub-pixels; select different numbers of the first sub-pixels and the second sub-pixels in each sub-pixel group of the first row to define a plurality of charge sharing modes for a source driver; respectively average pixel data of the selected first sub-pixels and the selected second sub-pixels in each sub-pixel group of the first row to obtain a first average value and a second average value for each charge sharing mode; reference each of the first sub-pixels and the second sub-pixels in a second row to a corresponding one of the first sub-pixels and the second sub-pixels in the first row; and calculate a transition power level for each of the first sub-pixels and the second sub-pixels in the second row under each charge sharing mode by transiting the first average value or the second average value of the corresponding one of the first sub-pixels and the second sub-pixels in the first row into a target pixel data of a corresponding one of the first sub-pixels and the second sub-pixels in the second row. The mode selector is electrically connected to the power calculator and is configured to sum the transition power of all first sub-pixels and second sub-pixels in each sub-pixel group in the first row to obtain a total channel power level under each of the charge sharing modes; and select one of the charge sharing modes with a minimum total channel power level for each of the sub-pixel groups in the first row.

DETAILED DESCRIPTION

Figure 1:
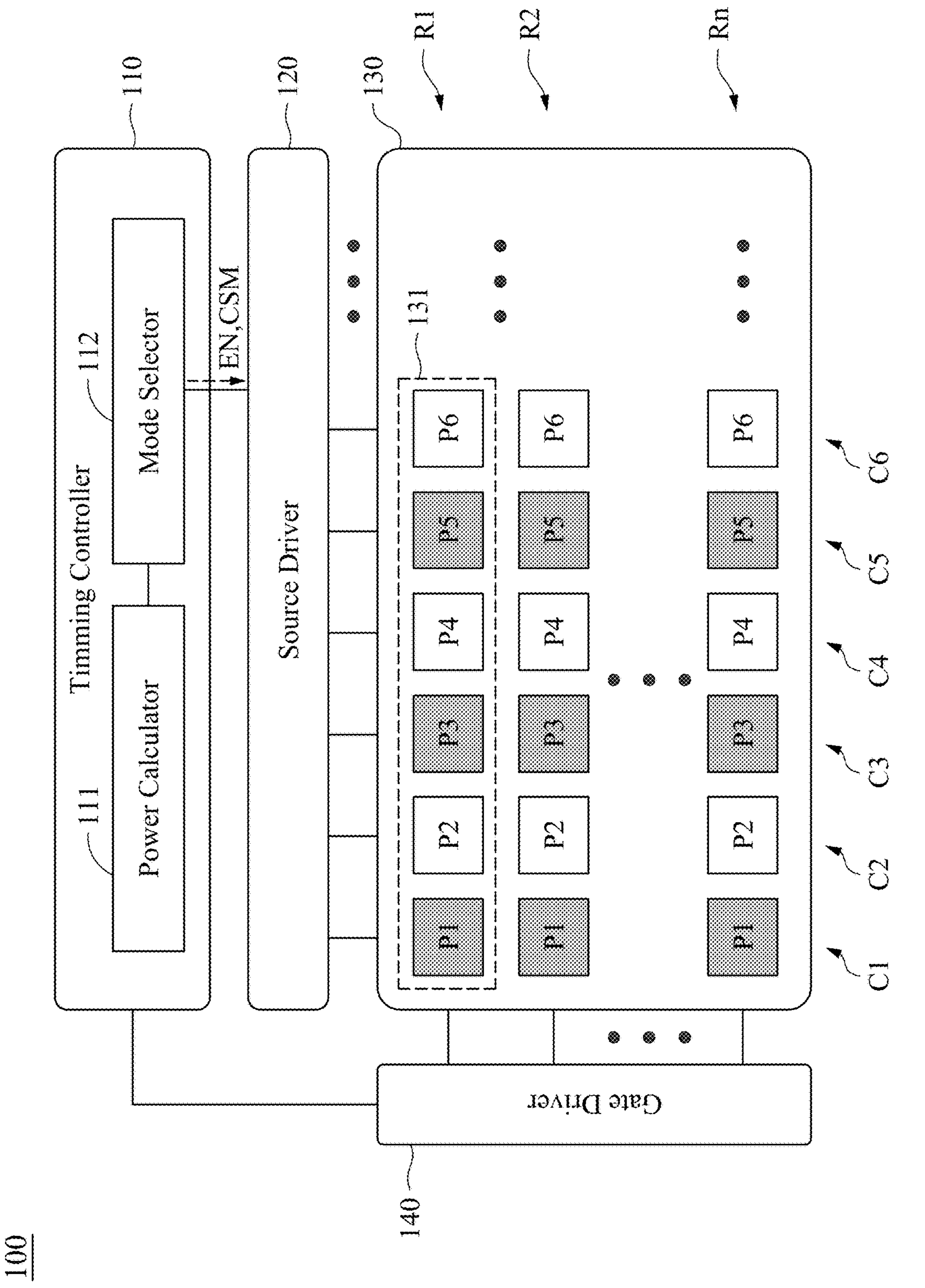
FIG. 1 is a schematic diagram showing a display system in accordance with an embodiment of the present disclosure.

Referring to FIG. 1, FIG. 1 is a schematic diagram showing a display system 100 in accordance with an embodiment of the present disclosure. The display system 100 includes a timing controller 110, a source driver 120, a display panel 130, and a gate driver 140. The timing controller 110 is electrically connected to the source driver 120 and the gate driver 140 to jointly control the driving operations of the display panel 130. The gate driver 140 sequentially activates the gate lines of the display panel 130 to select all sub-pixels P1 to Pn in each of the rows R1 to Rn, while the source driver 120 applies corresponding pixel data (i.e., voltage level) to the source lines for each column C1 to Cn.

The display panel 130 may include multiple sub-pixel groups 131 in each row, from rows R1 to Rn. Each of the sub-pixel groups 131 includes multiple first sub-pixels P1, P3, and P5, and multiple second sub-pixels P2, P4, and P6. The first sub-pixels P1, P3, and P5 are arranged in odd-numbered columns C1, C3, and C5 of each of the rows R1 to Rn, while the second sub-pixels P2, P4, and P6 are arranged in even-numbered columns C2, C4, and C6 of each of the rows R1 to Rn.

It should be understood that the number of first sub-pixels and second sub-pixels in each sub-pixel group 131 may vary according to actual application requirements such as a horizontal resolution of the display panel 130, the number of source drivers 120, and the number of driving channel in the source driver 120, and the present disclosure is not limited thereto.

In the embodiments of the disclosure, the first sub-pixels P1, P3, and P5 are driven by voltage levels of one polarity during each frame, and the second sub-pixels P2, P4, and P6 are driven by voltage levels of the opposite polarity during each frame. For example, during the current frame, the first sub-pixels P1, P3, and P5 are driven by positive voltage levels and the second sub-pixels P2, P4, and P6 are driven by negative voltage levels. During the next frame, the first sub-pixels P1, P3, and P5 are driven by negative voltage levels and the second sub-pixels are driven by positive voltage levels.

The timing controller 110 includes a power calculator 111 and a mode selector 112 for controlling the source driver 120 to dynamically select a charge sharing mode with minimum total channel power level for each of the rows R1 to Rn. Specifically, the power calculator 111 may calculate the total channel power level of each sub-pixel group 131 under each charge sharing mode, and the mode selector 112 generates a charge sharing enabling signal EN and a charge sharing mode signal CSM to the source driver 120 based on the power calculator results from the power calculator 111, so as to select no charge sharing mode or one of the charge sharing modes. In other words, each sub-pixel group 131 may achieve the minimum total channel power consumption when voltage levels of all its sub-pixels (e.g. first sub-pixels P1, P3, and P5 and second sub-pixels P2, P4, and P6) in the current row are transited to voltage levels of the corresponding pixels in the target row.

In some embodiments, the power calculator 111 may further include multiple logic blocks to implement the respective functions. These logic blocks may include, for example, a pixel data input buffer, a sub-pixel selection logic, an averaging computation logic, and a transition power calculation logic. These logic blocks may be implemented using digital hardware circuits, programmable logic, software executed on a processor, or any combination thereof. For example, the averaging computation logic may be implemented using an arithmetic logic unit (ALU), and the transition power estimation logic may be implemented as a lookup table or a difference calculator circuit. These logic blocks may be implemented individually or in combination, and are not limited to the specific examples listed above.

In some embodiments, the mode selector 112 may further include multiple logic blocks to implement the respective functions. These logic blocks may include, for example, a summation logic unit, a comparison logic, and a selection logic and may be implemented using hardware such as adders, comparators, multiplexers, software routines executed by a microcontroller, or a combination of these approaches. These logic blocks may be implemented individually or in combination, and are not limited to the specific examples listed above.

Figure 2:
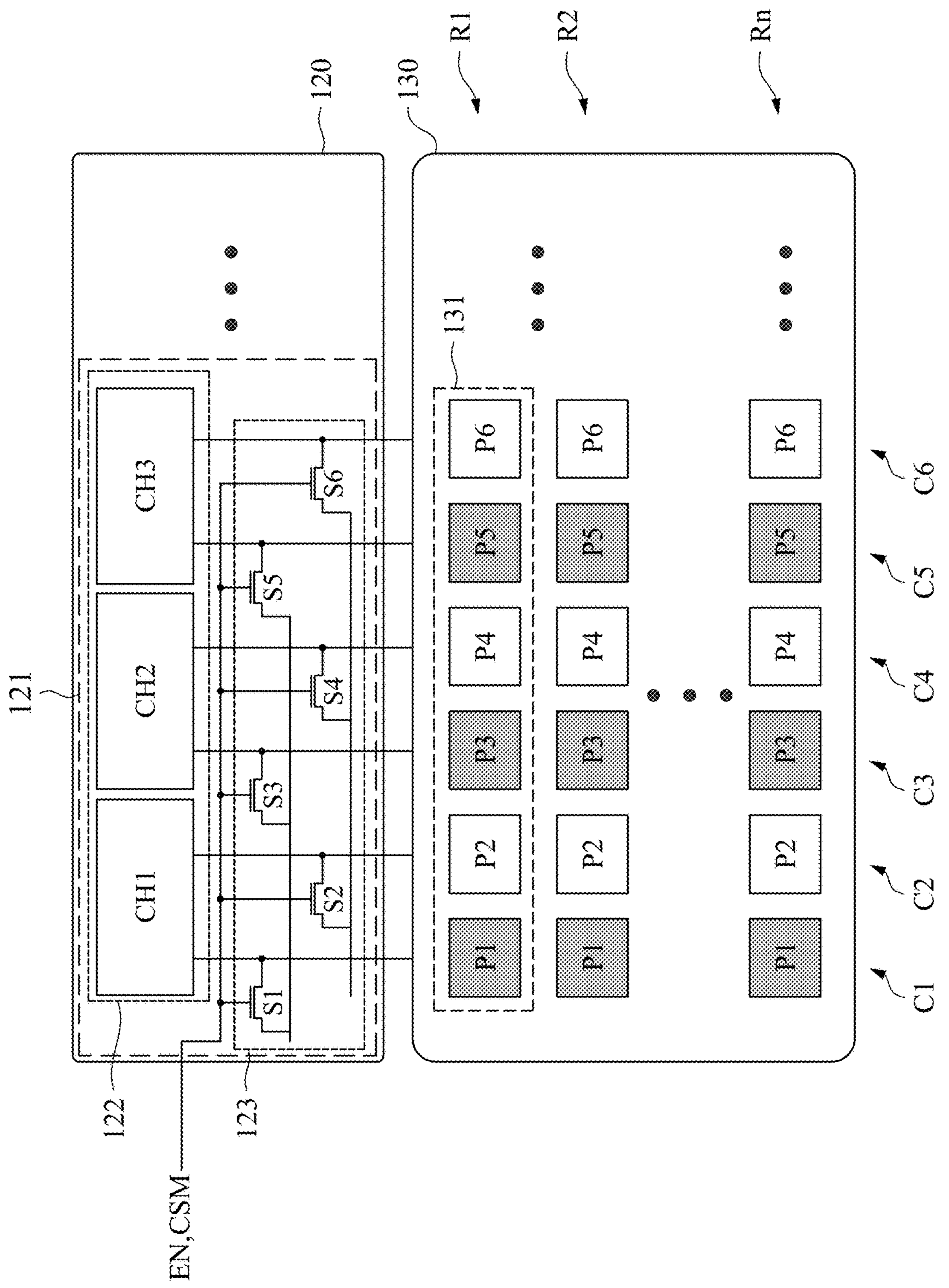
FIG. 2 is a schematic diagram showing an internal structure of the source driver in accordance with an embodiment of the present disclosure.

Referring to FIG. 2, FIG. 2 is a schematic diagram showing an internal structure of the source driver 120 in accordance with an embodiment of the present disclosure. For simplicity, some circuits or components may be omitted in the source driver 120 of FIG. 2. The source driver 120 may include driving circuits 121 each corresponding to driving a sub-pixel group 131 in each of the rows R1 to Rn. Each driving circuit 121 includes a buffer amplifier circuit 122 and a charge sharing circuit 123, in which the charge sharing circuit 123 is electrically connected between the buffer amplifier circuit 122 and the display panel 130.

Figure 3:
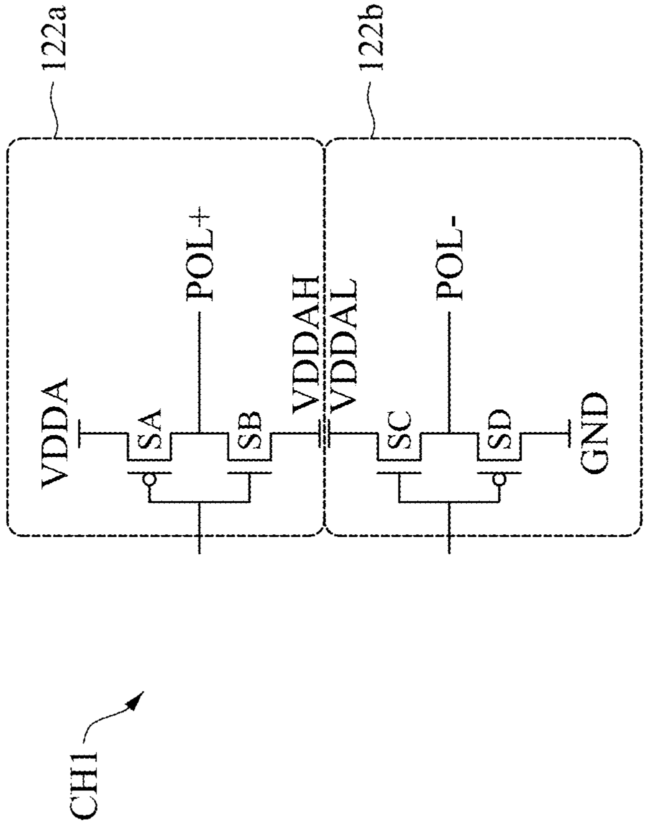
FIG. 3 is a schematic diagram showing a driving channel of the source driver in accordance with an embodiment of the present disclosure.

The buffer amplifier circuit 122 includes multiple driving channels CH1 to CH3 for providing voltage levels to the corresponding sub-pixel group 131 in each of the rows R1 to Rn. As shown in FIG. 3 using the driving channel CH1 as an example, the driving channel CH1 includes a first switching circuit 122*a* and a second switching circuit 122*b*, which respectively provide a positive voltage level (POL+) and a negative voltage level (POL−) to the display panel 130.

In such embodiment, for the positive voltage level (POL+), when the voltage level of the current sub-pixel in the current row is higher than that of the target sub-pixel in the target row (indicating a transition from a higher grayscale to a lower grayscale), the second switching circuit 122*b* may reuse the driving current from the first switching circuit 122*a*, thereby avoiding additional power consumption during the transition process. Conversely, when the voltage level of the current sub-pixel is lower than that of the target sub-pixel (indicating a transition from a lower grayscale to a higher grayscale), additional power consumption occurs during the transition.

For the negative voltage level (POL−), when the voltage level of the current sub-pixel is higher than that of the target sub-pixel (i.e., from a higher grayscale to a lower grayscale), the transition process results in additional power consumption. Conversely, when the voltage level of the current sub-pixel is lower than that of the target sub-pixel (i.e., from a lower grayscale to a higher grayscale), no additional power consumption occurs during the transition.

Figure 4A:
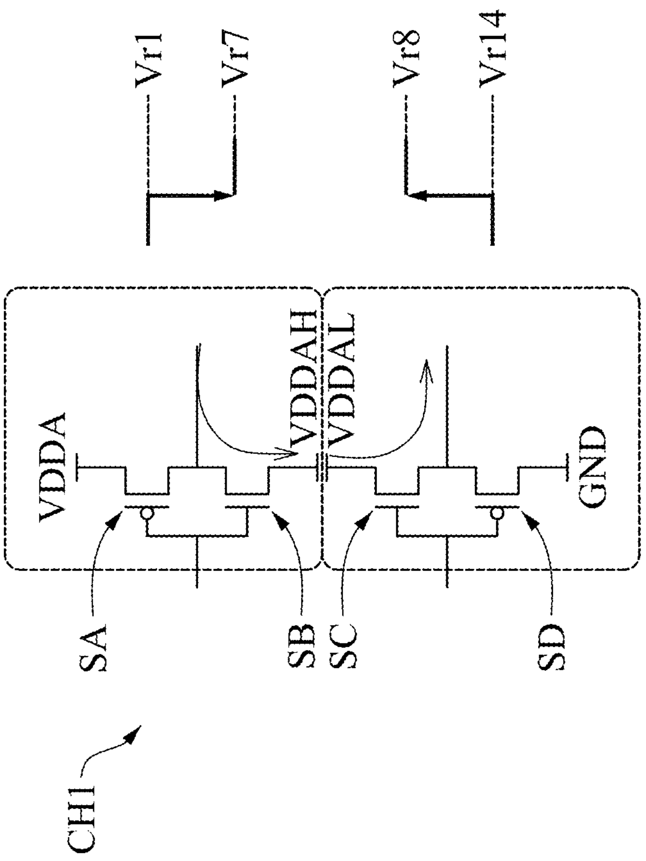
FIGS. 4A to 4D are schematic diagrams showing four examples of transition types between voltage levels in accordance with an embodiment of the present disclosure.
Figure 4B:
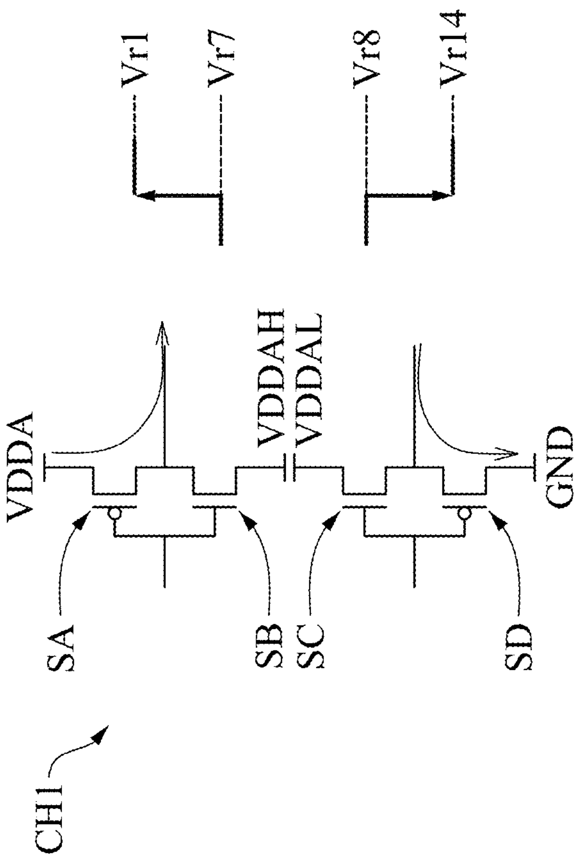
Figure 4C:
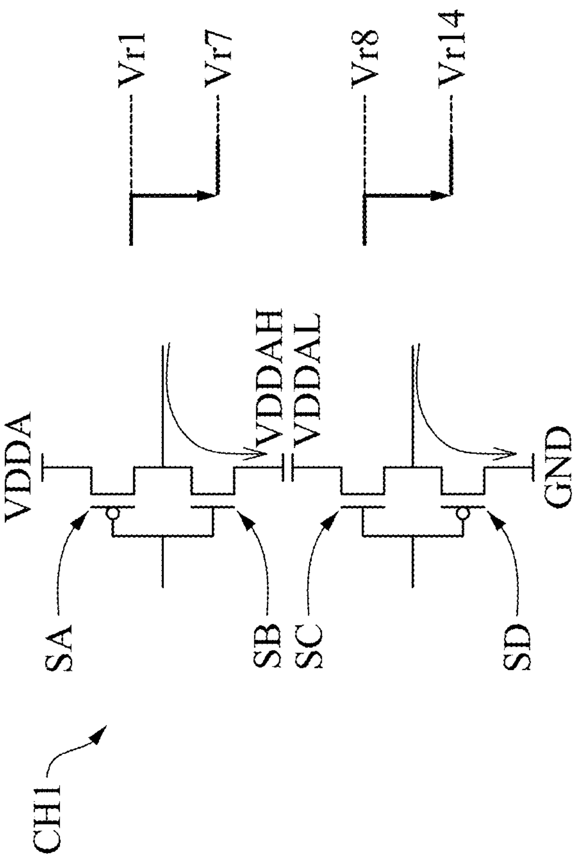

FIGS. 4A to 4C illustrate four examples of transition types between voltage levels. The positive voltage level (POL+) ranges from Vr1 to Vr7, corresponding to pixel data from grayscale 255 to grayscale 0. The negative voltage level (POL−) ranges from Vr8 to Vr14, corresponding to pixel data from grayscale 0 to grayscale 255.

In FIG. 4A, the positive voltage level (POL+) transitions from Vr1 to Vr7 (i.e., from the higher grayscale to the lower grayscale). Although the negative voltage level (POL−) transitions from Vr14 to Vr8 (also from the higher grayscale to the lower grayscale), the driving current from the first switching circuit 122*a* can be reused by the second switching circuit 122*b*. As a result, the power consumption of both first switching circuit 122*a* and the second switching circuit 122*b* cancels out, and no additional power is consumed.

In FIG. 4B, the positive voltage level (POL+) transitions from Vr7 to Vr1 (i.e., from the lower grayscale to the higher grayscale), and the negative voltage level (POL−) transitions from Vr8 to Vr14 (also from the lower grayscale to the higher grayscale). In this case, the first switching circuit 122*a* generates additional power consumption, while the second switching circuit 122*b* does not.

In FIG. 4C, the positive voltage level (POL+) transitions from Vr1 to Vr7 (i.e., from the higher grayscale to the lower grayscale), and the negative voltage level (POL−) transitions from Vr8 to Vr14 (i.e., from the lower grayscale to the higher grayscale). In this case, neither the first switching circuit 122*a* nor the second switching circuit 122*b* generates additional power consumption, and the driving current from the first switching circuit 122*a* can be reused by the second switching circuit 122*b*.

Figure 4D:
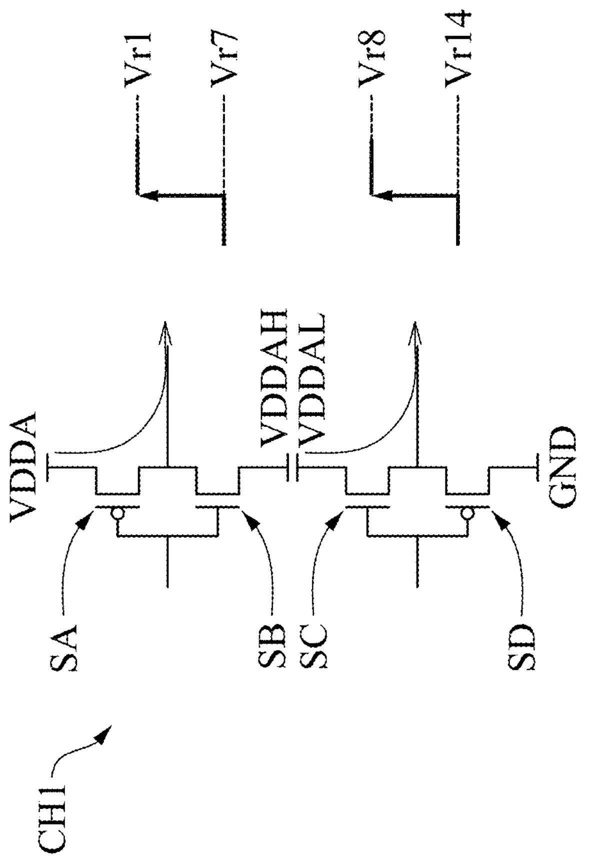

In FIG. 4D, the positive voltage level (POL+) transitions from Vr7 to Vr1 (i.e., from the lower grayscale to the higher grayscale), and the negative voltage level (POL−) transitions from Vr14 to Vr8 (i.e., from the higher grayscale to the lower grayscale). In this case, both the first switching circuit 122*a* and second switching circuit 122*b* generate additional power consumption.

Based on this phenomenon, the voltage level difference between the current sub-pixel and the target sub-pixel becomes a key factor in power consumption considerations. Accordingly, in each charge sharing mode, the timing controller 110 also determines whether the driving current of the first switching circuit 122*a* can be reused by the second switching circuit 122*b*, analyzes whether the transition is from higher to lower grayscale or from lower to higher grayscale, and evaluates whether the transition corresponds to a negative voltage level (POL−) or a positive voltage level (POL+), in order to calculate the total channel power level of the sub-pixel group 131.

Returning to FIG. 2, the charge sharing circuit 123 includes multiple switches S1 to S6. These switches S1 to S6 are turned on or off according to the charge sharing enable signal EN and the mode selection signal CSM provided from the timing controller 110, and based on the conduction states of switches S1 to Sn, the voltage levels supplied by different driving channels CH1 to CH3 are selected to be shared or not to be shared, and the number of voltage levels to be shared is determined.

The charge sharing enable signal EN is used to determine whether the charge sharing function is activated, while the charge sharing mode selection signal CSM is used to determine which of the charge sharing modes to implement. When the charge sharing enable signal EN is 0, all switches S1 to S6 are turned off to disable the charge sharing function. When the charge sharing enable signal EN is 1, the charge sharing function is activated, and the switches S1 to S6 required in the selected charge sharing mode are turned on according to the charge sharing mode selection signal CSM.

For example, but not limited thereto, when the bit value of the charge sharing mode signal CSM is 0000, which corresponds to the first charge sharing mode M1 in which the switches S1, S3, and S5 are turned on to share the voltage levels supplied to the first sub-pixels P1, P3, and P5, and switches S2, S4, and S6 are turned on to share the voltage levels supplied to the second sub-pixels P2, P4, and P6. When the bit value of the charge sharing mode signal CSM is 0001, which corresponds to the second charge sharing mode M2 in which the switches S1, S3, and S5 are turned on to share the voltage levels supplied to the first sub-pixels P1, P3, and P5, and the switches S2 and S4 are turned on to share the voltage levels supplied to the second sub-pixels P2 and P4. Therefore, the corresponding charge sharing mode is selected based on different bit values.

In an embodiment of the present disclosure, the total number of charge sharing modes is defined as the sum of combinations formed by selecting k1 first sub-pixels and k2 second sub-pixels from each sub-pixel group 131, where each sub-pixel group 131 includes n first sub-pixels and n second sub-pixels, and k1 and k2 range from 2 to n.

Taking the example in FIG. 2, the sub-pixel group 131 of the first row R1 includes three first sub-pixels (P1, P3, and P5) and three second sub-pixels (P2, P4, and P6). The values of k1 and k2 can range from selecting 2 to selecting 3 sub-pixels. As shown in Table 1, each charge sharing modes M1 to M16 are listed with corresponding 4-bit charge sharing mode signal CSM to control the switching states of the switches S1 to S6 of charge sharing circuit 123. The first charge sharing mode M1 may be selecting all three first sub-pixels (P1, P3, and P5) and all three second sub-pixels (P2, P4, and P6); the second charge sharing mode may be selecting all three first sub-pixels (P1, P3, and P5) and any two second sub-pixels (e.g., P2 and P4); the third charge sharing mode may be selecting any two first sub-pixels (e.g., P1 and P3) and any two second sub-pixels (e.g., P2 and P6); and so on, thereby defining multiple charge sharing modes M1 to M16 accordingly.

TABLE 1

| Charge Sharing Mode | Sharing Mode Signal (CSM) | Selected First Sub-pixels | Selected Second Sub-pixels |
|---|---|---|---|
| M1 | 0000 | P1, P3, P5 | P2, P4, P6 |
| M2 | 0001 | P1, P3, P5 | P2, P4 |
| M3 | 0010 | P1, P3, P5 | P2, P6 |
| M4 | 0011 | P1, P3, P5 | P4, P6 |
| M5 | 0100 | P1, P3 | P2, P4, P6 |
| M6 | 0101 | P1, P3 | P2, P4 |
| M7 | 0110 | P1, P3 | P2, P6 |
| M8 | 0111 | P1, P3 | P4, P6 |
| M9 | 1000 | P1, P5 | P2, P4, P6 |
| M10 | 1001 | P1, P5 | P2, P4 |
| M11 | 1010 | P1, P5 | P2, P6 |
| M12 | 1011 | P1, P5 | P4, P6 |
| M13 | 1100 | P3, P5 | P2, P4, P6 |
| M14 | 1101 | P3, P5 | P2, P4 |
| M15 | 1110 | P3, P5 | P2, P6 |
| M16 | 1111 | P3, P5 | P4, P6 |

Figure 5:
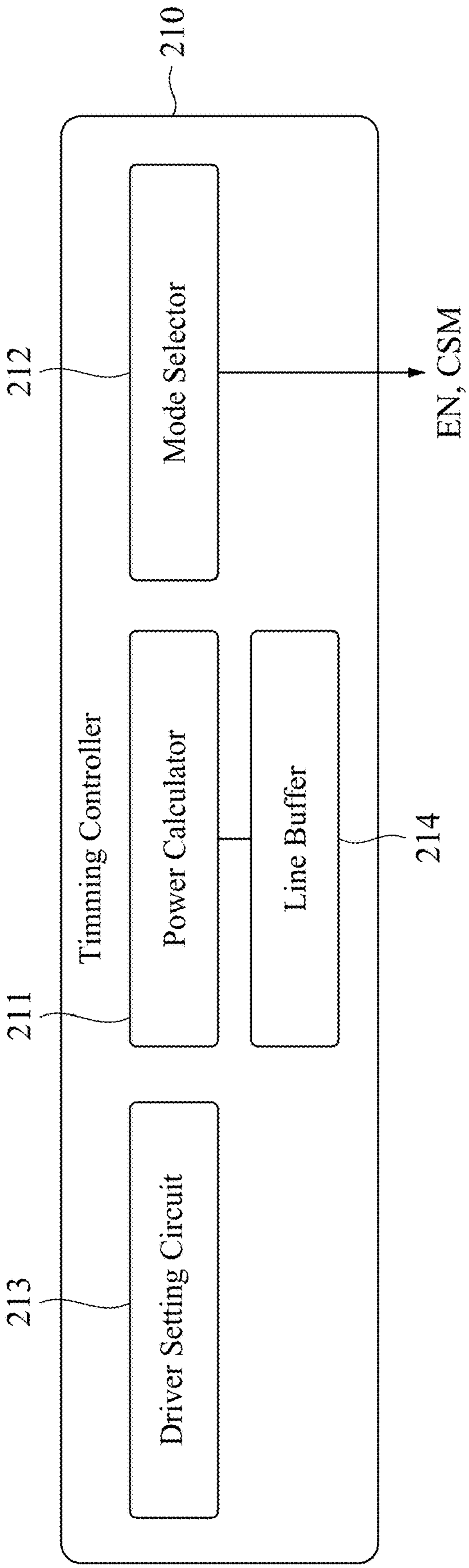
FIG. 5 is a flowchart showing a timing controller in accordance with an embodiment of the present disclosure.

Referring to FIG. 5, FIG. 5 is a schematic diagram showing a timing controller 210 in accordance with an embodiment of the present disclosure. The timing controller 210 includes a power calculator 211 and a mode selector 212 similar to those of the timing controller 110 in FIG. 1. However, the timing controller 210 further includes a driver setting circuit 213 and a line buffer 214.

The driver setting circuit 213 is electrically connected to the power calculator 211 to set the number of source drivers 120 used to drive the display panel 130. Specifically, depending on the actual application of the display panel 130, the display system 100 may include multiple source drivers 120. Therefore, in calculating the row-to-row transition power consumption, the timing controller 110 also need to take into account the number of source drivers 120 and the horizontal resolution of the display panel 130, in order to determine how many sub-pixel groups 131 each source driver 120 needs to drive and to calculate the total channel power consumption of each sub-pixel group 131 under each charge sharing mode.

In some embodiments, the driver setting circuit 213 may further include multiple logic blocks. These logic blocks may include, for example, a storage logic configured to store one or more driver-related parameters, such as the number of source drivers, and a parameter output interface configured to transmit the stored configuration information to the power calculator 111 for use in calculating transition power levels under different charge sharing modes. The logic blocks may be implemented using hardware registers, programmable logic, software-controlled registers, or any combination thereof.

Figure 6:
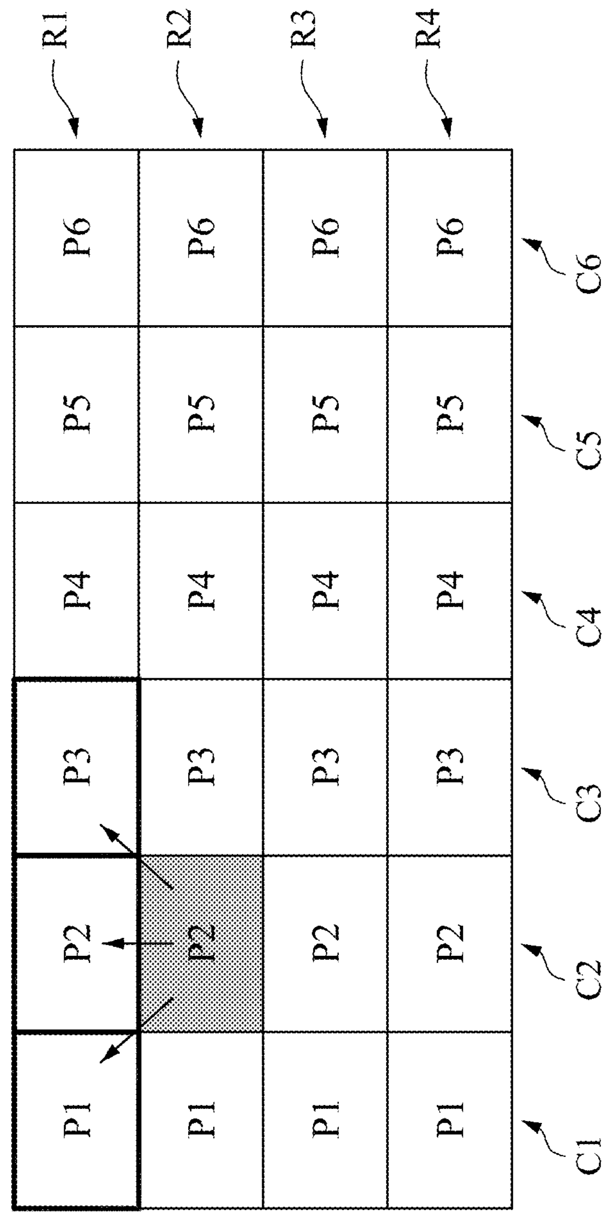
FIG. 6 is a flowchart showing a dynamic charge sharing control method in accordance with an embodiment of the present disclosure.

The line buffer 214 is electrically connected to the power calculator 211 to store position information of all sub-pixels in each sub-pixel group 131 for each of the rows R1 to Rn. Based on the position information, each sub-pixel in a row may be correctly referenced to the corresponding sub-pixel in the previous row. As shown in FIG. 6, each sub-pixel on the display panel 130 is stored with 2-bit temporary storage in the line buffer 214, where each bit value may correspond to a specific reference direction, for example, 0 represents upper-left, 1 represents upper-center, and 2 represents upper-right.

For example, based on the position information in the first row R1, the sub-pixel in the second row R2 and the second column C2 is referenced to the sub-pixel in the first row R1 and the second column C1 (upper-left) when the temporary data is 0, referenced to the sub-pixels in the first row R1 and the second column C2 (upper-center) when the temporary data is 1, and referenced to the sub-pixels in the first row R1 and the third column C3 (upper-right) when the temporary data is 2.

Figure 7:
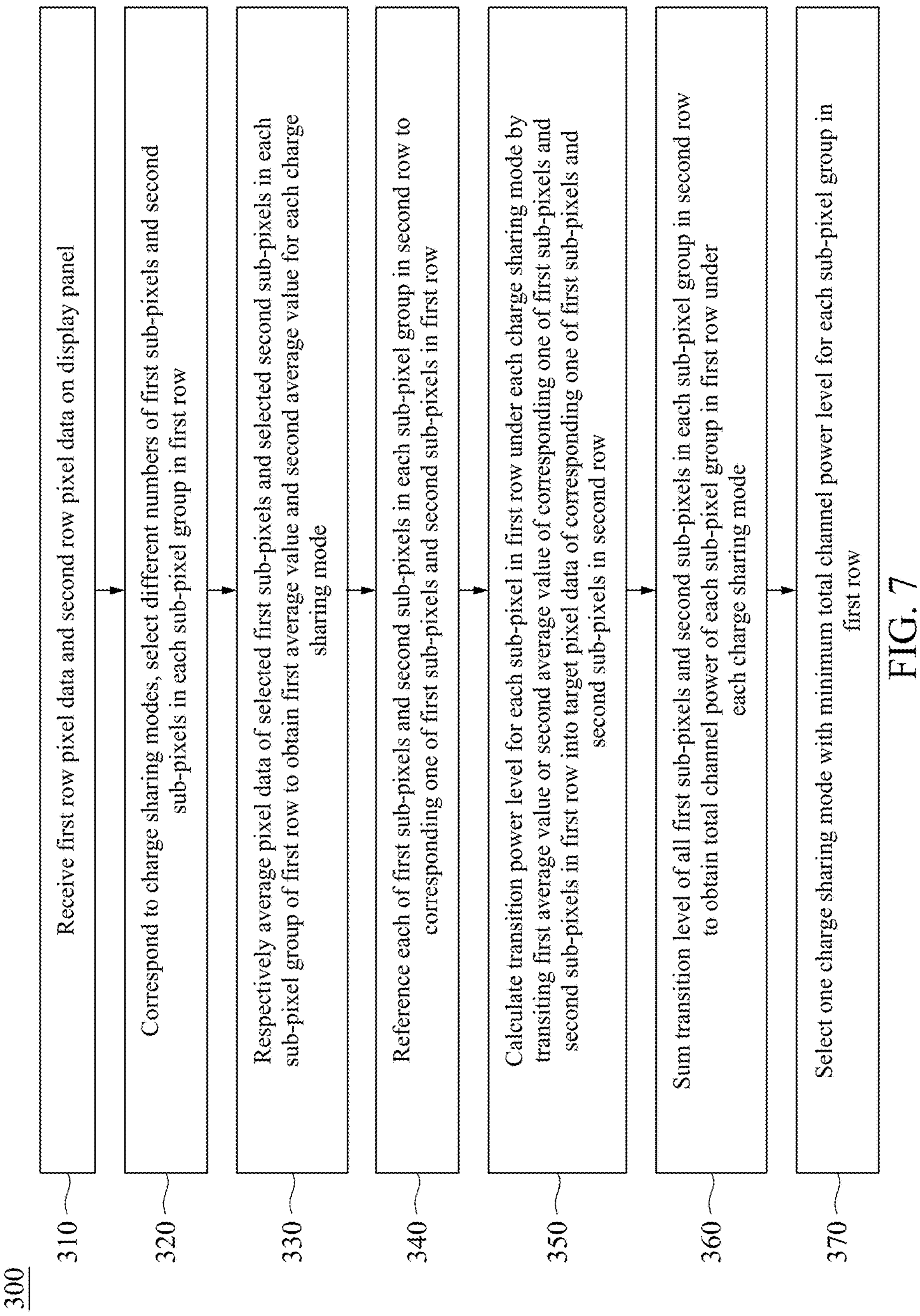
FIG. 7 is a schematic diagram showing a sub-pixel in a row referenced to the sub-pixel in previous row based on position information of the previous row in accordance with an embodiment of the present disclosure.

Referring to FIG. 7, FIG. 7 is a flowchart showing a dynamic charge sharing control method 300 in accordance with an embodiment of the present disclosure. The dynamic charge sharing control method 300 includes Steps 310 to 370 and may be applied to the configuration shown in FIG. 1 or another similar configuration. The configuration shown in FIG. 1 is taken as an example for the following description.

In Step 310, a first row pixel data and a second row pixel data on the display panel 130 are first received, which include the pixel data of each sub-pixel within all sub-pixel groups 131 in the first row R1 and the second row R2. Specifically, both the first row R1 and the second row R2 include multiple sub-pixel groups 131. For clarity, the dynamic charge sharing control method 300 is illustrated using the transition of one sub-pixel group 131 in the first row R1 to the corresponding sub-pixel group 131 in the second row R2 as an example. It should be understood that the transitions and power calculations for the remaining sub-pixel groups 131 are performed in the same manner as described.

In Step 320, corresponding to different charge sharing modes (M1 to M16), different numbers of first sub-pixels (P1, P3, and P5) and second sub-pixels (P2, P4, and P6) within the sub-pixel group 131 in the first row R1 are selected. As previously mentioned, multiple charge sharing modes may be predefined as any combination of selecting 2 to 3 sub-pixels from the first sub-pixels (P1, P3, and P5) and 2 to 3 sub-pixels from the second sub-pixels (P2, P4, and P6), thereby generating the charge sharing modes M1 to M16 as listed in Table 1.

In Step 330, the pixel data of the selected first sub-pixels (P1, P3, and P5) under each charge sharing mode are averaged to obtain the first average value CSLP for each charge sharing mode (M1 to M16). Similarly, the pixel data of the selected second sub-pixels (P2, P4, and P6) under each charge sharing mode are averaged to obtain the second average value CSLN for each charge sharing mode (M1 to M16). Therefore, a total of 16 first average values ($CSLP_{M1}$ to $CSLP_{M16}$) and 16 second average values ($CSLN_{M1}$ to $CSLN_{M16}$) are calculated in Step 330, corresponding to the 16 charge sharing modes (M1 to M16).

Taking the first charge sharing mode M1 as an example, where all first sub-pixels P1, P3, and P5 and all second sub-pixels P2, P4, and P6 are selected, the first average value $CSLP_{M1}$ and the second average value $CSLN_{M1}$ under the first charge sharing mode M1 can be expressed as:

$$CSLP_{M1} = \frac{(D_{6N+1} + D_{6N+3} + D_{6N+5})}{3}, \text{ and}$$

$$CSLN_{M1} = \frac{(D_{6N+2} + D_{6N+4} + D_{6N+6})}{3}.$$

In the above equations, the parameter N ranges from 0 to $$\left(\frac{RESX/SEG}{2}\right),$$

RESX represents the horizontal resolution of the display panel 130, and SEG represents the total number of source drivers 120 used to drive the display panel 130. From the parameter N, the number of the sub-pixel groups 131 in each row is depend on the horizontal resolution RESX of the display panel 130 and the total number of source drivers 120 used to drive the display panel 130. Additionally, in an embodiment where the display system 100 includes only one source driver 120, SEG may be excluded from the equation.

Specifically, in the first charge sharing mode M1, when N equals 0, representing the first sub-pixel group 131 in the first row R1, the first average value $CSLP_{M1}$ is (D1+D3+D5)/3 and the second average value $CSLN_{M1}$ is (D2+D4+D6)/3; and when N is equal to 1, representing the second sub-pixel group 131 in the first row R1 (not shown in FIG. 1), the first average value $CSLP_{M1}$ is (D7+D9+D11)/3 and the second average value $CSLN_{M1}$ is (D8+D10+D12)/3, and so on.

When N is equal to $$\left(\frac{RESX/SEG}{2}\right),$$

the first average value $CSLP_{M1}$ and the second average value $CSLN_{M1}$ of the last sub-pixel group 131 in the first row R1 (not shown in FIG. 1) are calculated correspondingly. D1, D3, D5, D7, D9, and D11 represent the pixel data of the first sub-pixels P1, P3, P5, P7, P9, and P11 respectively, while D2, D4, D6, D8, D10, and D12 represent the pixel data of the second sub-pixels P2, P4, P6, P8, P10, and P12 respectively. Although each row of FIG. 1 does not show the remaining sub-pixels other than sub-pixels P1~P6, a person having ordinary knowledge in the art should be able to deduce the arrangement of the remaining sub-pixels (e.g., P7~P12) and the relevant calculation method based on the above description.

Taking the second charge sharing mode M2 as another example, where all first sub-pixels P1, P3, and P5 and two second sub-pixels P2 and P4 are selected, the first average value $CSLP_{M2}$ and the second average value $CSLN_{M2}$ under the second charge sharing mode M2 can be expressed as:

$$CSLP_{M2} = \frac{(D_{6N+1} + D_{6N+3} + D_{6N+5})}{3}, \text{ and}$$

$$CSLN_{M2} = \frac{\frac{(D_{6N+2} + D_{6N+4})}{2}}{2 \times \frac{2}{3}}.$$

In the above equations, the parameter N also ranges from 0 to $$\left(\frac{RESX/SEG}{2}\right).$$

Specifically, in the second charge sharing mode M2, when N equals 0, representing the first sub-pixel group 131 in the first row R1, the first average value $CSLP_{M2}$ is (D1+D3+D5)/3 and the second average value $CSLN_{M2}$ is (D2+D4)/2; and when N is equal to 1, representing the second sub-pixel group 131 (not shown in FIG. 1) in the first row R1, the first average value $CSLP_{M2}$ is (D7+D9+D11)/3 and the second average value $CSLN_{M2}$ is (D8+D10)/2.

When N is equal to $$\left(\frac{RESX/SEG}{2}\right),$$

the first average value $CSLP_{M2}$ and the second average value $CSLN_{M2}$ of the last sub-pixel group 131 (not shown in FIG. 1) in the first row R1 are calculated correspondingly. It should be noted that, in the second charge sharing mode M2, the selection of two second sub-pixels (P2 and P4) leads to the inclusion of a ⅔ factor in the equation, representing the ratio of selected second sub-pixels. In the remaining charge sharing modes M3 to M16, the calculation is similar to that of charge sharing modes M1 and M2 and will not repeated here.

In Step 340, each of the first sub-pixels P1, P3, and P5 and second sub-pixels P2, P4, and P6 in the second row R2 is referenced to the corresponding one of the first sub-pixels P1, P3, and P5 and second sub-pixels P2, P4, and P6 in the first row R1, respectively.

In the embodiment of the present disclosure, step 340 further includes obtaining the position information of each of the first sub-pixels P1, P3, and P5 and the second sub-pixels P2, P4, and P6 in the first row R1, in order to select whether each sub-pixel (P1 to P6) in the second row R2 corresponds, in the actual spatial position of the display panel 130, to its upper-left, upper-center, or upper-right sub-pixel in the first row R1. The position information of the first sub-pixels (P1, P3, and P5) and second sub-pixels (P2, P4, and P6) in the first row R1 may be stored in the line buffer 214 (shown in FIG. 5) or in an additional memory.

In Step 350, the transition power level of each sub-pixel in the first row R1 is calculated under each charge sharing mode (M1 to M16). Specifically, based on the first average values ($CSLP_{M1}$ to $CSLP_{M16}$) and second average values ($CSLN_{M1}$ to $CSLN_{M16}$) obtained in step 330, and after each sub-pixel in the second row R2 has been referenced to its corresponding sub-pixel in the first row R1, the transition power level can be calculated as the power consumed when transiting the corresponding average value (either CSLP or CSLN) of a sub-pixel in the first row R1 into the target pixel data of the corresponding sub-pixel in the second row R2.

In Step 360, the transition power levels of all sub-pixels (P1 to P6) within the same sub-pixel group 131 in the first row R1 are summed to obtain the total channel power level of that sub-pixel group 131 under each charge sharing mode (M1 to M16).

In Step 370, one of the charge sharing modes (M1 to M16) with the minimum total channel power level is selected for each sub-pixel group 131 in the first row R1.

Please refer to Example Table 2 and Table 3 for a comparative explanation of the dynamic charge sharing control method 300 in terms of transition power level, channel power level, and total channel power level, respectively, under the condition without charge sharing and under one of the charge sharing modes (M1):

TABLE 2

| No Charge Sharing Mode | | | | | | |
|---|---|---|---|---|---|---|
| POL | + | − | + | − | + | − |
| Sub-pixel | P1 | P2 | P3 | P4 | P5 | P6 |
| Rn | 255 | 255 | 64 | 0 | 0 | 128 |
| Rn + 1 | 0 | 0 | 0 | 255 | 255 | 0 |
| Transition Power Level | −255 | +255 | −64 | −255 | +255 | +128 |
| Channel Power Level | 0 | | 0(−318) | | +383 | |
| Total Channel Power Level | | | +383 | | | |

TABLE 3

| Charge Sharing Mode M1 | | | | | | |
|---|---|---|---|---|---|---|
| POL | + | − | + | − | + | − |
| Sub-pixel | P1 | P2 | P3 | P4 | P5 | P6 |
| Rn | 255 | 255 | 64 | 0 | 0 | 128 |
| CSLP/CSLN | 106 | 127 | 106 | 127 | 106 | 127 |
| Rn + 1 | 0 | 0 | 0 | 255 | 255 | 0 |
| Transition Power Level | −106 | +127 | −106 | −128 | +149 | +127 |
| Channel Power Level | +21 | | 0(−234) | | +276 | |
| Total Channel Power Level | | | +297 | | | |

In Table 2 and Table 3, the sub-pixels P1 to P6 in the row Rn belong to the same sub-pixel group 131. The sub-pixels in the odd-numbered columns, namely P1, P3, and P5, are first sub-pixels driven by a positive polarity (+) in the current frame, while the sub-pixels in the even-numbered columns, namely P2, P4, and P6, are second sub-pixels driven by a negative polarity (−) in the current frame. In the row Rn, the grayscale of sub-pixels P1 to P6 are 255, 255, 64, 0, 0, and 128, respectively. In the row Rn+1, the corresponding grayscale of sub-pixels P1 to P6 are 0, 0, 0, 255, 255, and 0, respectively.

When the charge sharing function is not enabled, the pixel data between the current row Rn and the target row Rn+1 is directly transitioned. In other words, the transitions occur as follows: from grayscale 255 to 0, from 0 to 255, from 64 to 0, from 0 to 255, from 0 to 255, and from 128 to 0. As previously described, in the embodiment where each driving channel CH1 to CH3 of the source driver 120 (as shown in FIG. 3) includes the first switching circuit 122*a* and the second switching circuit 122*b*, the calculation of transition power level further involves analyzing whether the transition is from a higher grayscale to a lower grayscale or from a lower grayscale to a higher grayscale, and evaluating whether the transition corresponds to a negative voltage level (POL−) or a positive voltage level (POL+).

Therefore, the first sub-pixel P1 corresponding to positive polarity (+), the first sub-pixel P3 corresponding to positive polarity (+), and the second sub-pixel P4 corresponding to negative polarity (−) do not incur additional transition power level and are thus marked with negative values. In contrast, the second sub-pixel P2 corresponding to negative polarity (−), the first sub-pixel P5 corresponding to positive polarity (+), and the second sub-pixel P6 corresponding to negative polarity (−) incur additional transition power level and are therefore marked with positive values.

The channel power level generated by the group of sub-pixels (first sub-pixel P1 and second sub-pixel P2) driven by the driving channel CH1 is (−255)+255=0. The channel power level generated by the group of sub-pixels (first sub-pixel P3 and second sub-pixel P4) driven by the driving channel CH2 is (−64)+ (−255)=−318, which is considered equivalent to 0. The channel power level generated by the group of sub-pixels (first sub-pixel P5 and second sub-pixel P6) driven by the driving channel CH3 is 255+128=383. The total channel power level is calculated as 0+0+383=383.

When the charge sharing function is enabled, the pixel data of the selected first sub-pixels are first be used to calculate the first average value (CSLP) for each charge sharing mode (M1 to M16), and the pixel data of the selected second sub-pixels are used to calculate the second average value (CSLN), before the transition power level calculation is performed. Based on the aforementioned formulas for first average value CSLP and first average value CSLN, the voltage level of the first sub-pixels P1, P3, and P5 is shared as 106 under the first charge sharing mode M1, while the voltage level of the second sub-pixels P2, P4, and P6 is shared as 127 under the first charge sharing mode M1.

Subsequently, in the current row Rn, each of the sub-pixels P1 to P6 transitions from first average value (CSLP) or second average value (CSLN) to the corresponding grayscale in the target row Rn+1. Specifically, the transitions are as follows: from voltage level 106 to grayscale 0, from voltage level 127 to grayscale 0, from voltage level 106 to grayscale 0, from voltage level 127 to grayscale 255, from voltage level 106 to grayscale 255, and from voltage level 127 to grayscale 0.

Based on the same determination criteria, in the embodiment where each driving channel CH1 to CH3 of the source driver 120 (as shown in FIG. 3) includes the first switching circuit 122*a* and the second switching circuit 122*b*, the first sub-pixel P1 corresponding to positive polarity (+), the first sub-pixel P3 corresponding to positive polarity (+), and the second sub-pixel P4 corresponding to negative polarity (−) do not generate additional transition power level. In contrast, the second sub-pixel P2 corresponding to negative polarity (−), the first sub-pixel P5 corresponding to positive polarity (+), and the second sub-pixel P6 corresponding to negative polarity (−) generates additional transition power level.

The channel power level generated by the group of sub-pixels (first sub-pixel P1 and second sub-pixel P2) driven by the driving channel CH1 is (−106)+127=21. The channel power level generated by the group of sub-pixels (first sub-pixel P3 and second sub-pixel P4) driven by the driving channel CH2 is (−106)+ (−128)=−234, which is considered equivalent to 0. The channel power level generated by the group of sub-pixels (first sub-pixel P5 and second sub-pixel P6) driven by the driving channel CH3 is 149+127=276. Thus, the total channel power level is calculated as 21+0+276=297.

By executing the above described process for each of the charge sharing modes M1 to M16, the total channel power level consumed during the transition from the current row Rn to the next row Rn+1 can be calculated for each charge sharing mode M1 to M16. Accordingly, the charge sharing mode with the minimum total channel power level can be selected as the charge sharing configuration for the current row Rn. It is worth noting that the total channel power levels calculated for the charge sharing modes M1 to M16 are also compared with the total channel power level calculated without charge sharing. If the total channel power level without charge sharing is smaller, the charge sharing function will be disabled.

In summary, the present disclosure provides a timing controller and a dynamic charge sharing control method that selects and combines different numbers of first and second sub-pixels under various charge sharing modes, calculates the average shared voltage levels of the selected pixel data, and evaluates the transition power based on the differences between the shared voltage level and the actual pixel data of the corresponding sub-pixels in the next row. For each driving channel, the channel power level is calculated into the total channel power level for each row under each charge sharing mode. By comparing the total channel power level across all charge sharing modes and the case without charge sharing, the mode with the minimum total channel power level is selected as the optimal charge sharing configuration for the current row. This timing controller and method thereof effectively reduces the power consumption during display updates.

Although the description provided above is of various embodiments of the disclosure, this should not limit the scope of the disclosure. Those with ordinary skill in the art can make various modifications without departing from the spirit and scope of the disclosure. Therefore, the scope of protection of the present disclosure shall be determined by the following claims.

What is claimed is:

1. A timing controller, comprising:
a power calculator, configured to:
receive pixel data in a first row and a second row on a display panel, wherein the first row and the second row each include a plurality of sub-pixel groups, and each of the sub-pixel groups comprises a plurality of first sub-pixels and a plurality of second sub-pixels;
select different numbers of the first sub-pixels and the second sub-pixels in each sub-pixel group of the first row to define a plurality of charge sharing modes for a source driver;
respectively average the pixel data of the selected first sub-pixels and the selected second sub-pixels in each sub-pixel group of the first row to obtain a first average value and a second average value for each charge sharing mode;
reference each of the first sub-pixels and the second sub-pixels in a second row to a corresponding one of the first sub-pixels and the second sub-pixels in the first row; and
calculate a transition power level for each of the first sub-pixels and the second sub-pixels in the second row under each charge sharing mode by transiting the first average value or the second average value of the corresponding one of the first sub-pixels and the second sub-pixels in the first row into a target pixel data of a target sub-pixel in the second row; and
a mode selector, electrically connected to the power calculator and configured to:
sum the transition power of all first sub-pixels and second sub-pixels in each sub-pixel group in the first row to obtain a total channel power level under each of the charge sharing modes; and
select one of the charge sharing modes with a minimum total channel power level for each of the sub-pixel groups in the first row.

2. The timing controller of claim 1, wherein the first sub-pixels are driven by a positive voltage level and the second sub-pixels are driven by a negative voltage level during a current frame.

3. The timing controller of claim 2, wherein the first sub-pixels in each sub-pixel group are arranged in odd-numbered columns of the first row and the second row, and the second sub-pixels in each sub-pixel group are arranged in even-numbered columns of the first row and the second row.

4. The timing controller of claim 2, wherein the source driver comprises a plurality of driving channels, each of the driving channels comprises a first driving circuit for providing the positive voltage level and a second driving circuit for providing the negative voltage level, the power calculator further configured to:

determine whether the transition between each of the first sub-pixels and the second sub-pixels in the first row and the corresponding one of the first sub-pixels and the second sub-pixels in the second row consumes power or not, wherein the transition power level is determined as a consumed power in response to the first average value being lower than the target pixel data and in response to the second average value being higher than the target pixel data.

5. The timing controller of claim 4, wherein a total number of the charge sharing modes is defined as the sum of combinations formed by selecting k1 first sub-pixels from each sub-pixel group and k2 second sub-pixels from each sub-pixel group, where each sub-pixel group comprises n first sub-pixels and n second sub-pixels and k1 and k2 range from 2 to n.

6. The timing controller of claim 1, further comprising:

a line buffer electrically connected to the power calculator and configured to store a position information of the first sub-pixels and the second sub-pixels in the first row, wherein the power calculator references the target sub-pixel in the second row to the corresponding one of the first sub-pixels and the second sub-pixels in the first row based on the position information, wherein the corresponding one of the first sub-pixels and the second sub-pixels in the first row are located at an upper-left, an upper-center, or an upper right of the target sub-pixel in the second row.

7. The timing controller of claim 1, wherein the display panel is driven by a plurality of source drivers, the timing controller further comprising:

a driver setting circuit electrically connected to the power calculator and configured to set the number of the source drivers.

8. The timing controller of claim 7, wherein a number of the sub-pixel groups in each row is depend on a horizontal resolution of the display panel and a total number of source drivers used to drive the display panel.

9. A dynamic charge sharing control method for a timing controller, comprising:

receiving pixel data in a first row and a second row on a display panel, wherein the first row and the second row each include a plurality of sub-pixel groups, and each of the sub-pixel groups comprises a plurality of first sub-pixels and a plurality of second sub-pixels;

selecting different numbers of the first sub-pixels and the second sub-pixels in each sub-pixel group of the first row to define a plurality of charge sharing modes;

respectively averaging the pixel data of the selected first sub-pixels and the selected second sub-pixels in each sub-pixel group of the first row to obtain a first average value and a second average value for each charge sharing mode;

referencing each of the first sub-pixels and the second sub-pixels in the second row to a corresponding one of the first sub-pixels and the second sub-pixels in the first row;

calculating a transition power level for each of the first sub-pixels and the second sub-pixels in the first row under each charge sharing mode by transiting the first average value or the second average value of the corresponding one of the first sub-pixels and the second sub-pixels in the first row into a target pixel data of a target sub-pixel in the second row;

summing the transition power level of all first sub-pixels and second sub-pixels in each sub-pixel group in the first row to obtain a total channel power level for each sub-pixel group under each charge sharing mode; and selecting one of the charge sharing modes with a minimum total channel power level for each of the sub-pixel groups in the first row.

10. The dynamic charge sharing control method of claim 9, wherein the first sub-pixels are driven by a positive voltage level and the second sub-pixels are driven by a negative voltage level during a current frame.

11. The dynamic charge sharing control method of claim 10, wherein the first sub-pixels in each sub-pixel group are arranged in odd-numbered columns of the first row and the second row, and the second sub-pixels in each sub-pixel group are arranged in even-numbered columns of the first row and the second row.

12. The dynamic charge sharing control method of claim 10, wherein a source driver comprises a plurality of driving channels, each of the driving channels comprises a first switching circuit for providing the positive voltage level and a second switching circuit for providing the negative voltage level, the dynamic charge sharing control method further comprising:

determining whether the transition between each of the first sub-pixels and the second sub-pixels in the first row and the corresponding one of the first sub-pixels and the second sub-pixels in the second row consumes power or not;

wherein the transition power level is determined as a consumed power in response to the first average value being lower than the target pixel data and in response to the second average value being higher than the target pixel data.

13. The dynamic charge sharing control method of claim 12, further comprising:

summing the transition power level of the first sub-pixels and the second sub-pixels in the first row driven by the same driving channel to obtain a channel power level for each of the driving channels; and summing the channel power level of each of the driving channels to obtain the total channel power level.

14. The dynamic charge sharing control method of claim 9, wherein a number of the sub-pixel groups in each row is depend on a horizontal resolution of the display panel and a total number of source drivers used to drive the display panel.

15. The dynamic charge sharing control method of claim 9, further comprising:

calculating the transition power level for each of the first sub-pixels and the second sub-pixels in the second row without charge sharing by transiting the pixel data of each of the first sub-pixels and the second sub-pixels in the first row into the target pixel data of the corresponding one of the first sub-pixels and the second sub-pixels in the second row;

summing the transition power level of all first sub-pixels and second sub-pixels in each sub-pixel group of the first row to obtain the total channel power level without charge sharing; and selecting the one with the minimum total channel power level between no charge sharing and the charge sharing modes for each of the sub-pixel groups in the second row.

16. The dynamic charge sharing control method of claim 9, wherein the step of referencing each of the first sub-pixels and the second sub-pixels in the second row to the corresponding one of the first sub-pixels and the second sub-pixels in the first row further comprising:

obtaining a position information for the first sub-pixels and the second sub-pixels in the first row; and referencing the target sub-pixel in the second row to the corresponding one of the first sub-pixels and the second sub-pixels in the first row based on the position information, wherein the corresponding one of the first sub-pixels and the second sub-pixels in the first row are located at an upper-left, an upper-center, or an upper right of the target sub-pixel in the second row.

17. The dynamic charge sharing control method of claim 9, wherein a total number of the charge sharing modes is defined as the sum of combinations formed by selecting k1 first sub-pixels from each sub-pixel group and k2 second sub-pixels from each sub-pixel group, where each sub-pixel group comprises n first sub-pixels and n second sub-pixels, and k1 and k2 range from 2 to n.

* * * * *